United States Patent
O et al.

(10) Patent No.: US 7,466,998 B2
(45) Date of Patent: Dec. 16, 2008

(54) LAYOUT AND ARCHITECTURE FOR REDUCED NOISE COUPLING BETWEEN CIRCUITRY AND ON-CHIP ANTENNA

(75) Inventors: Kenneth K. O, Gainesville, FL (US); Jesal Mehta, Greensboro, NC (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 757 days.

(21) Appl. No.: 10/836,524

(22) Filed: Apr. 30, 2004

(65) Prior Publication Data

US 2004/0219895 A1    Nov. 4, 2004

Related U.S. Application Data

(60) Provisional application No. 60/466,620, filed on Apr. 30, 2003.

(51) Int. Cl.
*H04M 1/00* (2006.01)
(52) U.S. Cl. .................... 455/575.7; 455/570
(58) Field of Classification Search .......... 455/73, 455/90, 66, 78, 80, 82, 570, 114.2, 222, 278.1, 455/283, 296, 310, 284, 562.1, 575.7, 562; 257/723, 724
See application file for complete search history.

(56) References Cited

U.S. PATENT DOCUMENTS

| | | | |
|---|---|---|---|
| 4,442,590 A | | 4/1984 | Stockton et al. |
| 5,898,909 A | * | 4/1999 | Yoshihara et al. ............. 455/73 |
| 6,016,255 A | * | 1/2000 | Bolan et al. ................. 361/807 |
| 6,373,447 B1 | | 4/2002 | Rostoker et al. |
| 6,512,482 B1 | | 1/2003 | Nelson et al. |
| 6,646,328 B2 | | 11/2003 | Tsai |
| 2002/0186168 A1 | | 12/2002 | Cheah |
| 2003/0020062 A1 | * | 1/2003 | Faris ........................... 257/40 |
| 2003/0132430 A1 | * | 7/2003 | Tsai ............................. 257/2 |

OTHER PUBLICATIONS

Butler, Lloyd "Unwanted Coupling of Stray Signal or Noise" Amateur Radio, Jun. 1993, pp. 1-14.

* cited by examiner

*Primary Examiner*—Tu X Nguyen
(74) *Attorney, Agent, or Firm*—Saliwanchik, Lloyd & Saliwanchik

(57) ABSTRACT

An integrated circuit layout and architecture for reduced noise coupling between circuitry and on-chip antenna for wireless communications includes a monolithic semiconducting substrate having a plurality of integrated devices including a transmitter and/or a receiver. At least one on-chip balanced antenna is formed in or on the substrate. A balanced antenna feed structure electrically connects the antenna to the transmitter or receiver. At least one integrated device is substantially symmetrically disposed on the substrate relative to the on-chip antenna(s). The device(s) selected for substantially symmetrically placement are preferably those which generate the largest noise coupling.

10 Claims, 10 Drawing Sheets

LAYOUT AND ARCHITECTURE FOR REDUCED NOISE COUPLING BETWEEN CIRCUITRY AND ON-CHIP ANTENNA

CROSS-REFERENCE TO RELATED APPLICATIONS

This application claims the benefit of provisional application No. 60/466,620 entitled "A METHOD OF REDUCING INTERACTION BETWEEN INTEGRATED ANTENNAS AND ADJACENT CIRCUITS" filed on Apr. 30, 2003, the entirety of which is incorporated herein by reference.

STATEMENT REGARDING FEDERALLY SPONSORED RESEARCH OR DEVELOPMENT

Not applicable.

FIELD OF THE INVENTION

The invention relates to integrated circuits which include on-chip antennas.

BACKGROUND

The increases in the operating frequency and projected die size of CMOS circuits have led to the proposal of wireless interconnects based on on-chip antennas. On-chip antennas can provide a high speed alternative to a conventional wired interconnection system through use of RF communications which travel over the air at nearly the speed of light. The on-chip antennas can facilitate wireless communications both within a single integrated circuit (IC), such as from one side of a chip to the other side, as well as between a plurality of IC's each having on-chip antennas and related communication circuitry.

A challenge for on-chip antennas is achieving an adequate signal-to-noise ratio for received signals. Electromagnetic interference (EMI), or noise, can be generated near IC's due to nearby devices and within the IC's themselves due to on-chip devices sharing the same substrate as the on-chip antenna(s). For instance, modern integrated circuits can include billions of switching transistors which all generate switching noise. Such noise can interfere with devices sending RF signals, or more importantly for devices receiving RF signals, due to lower received signal levels as compared to transmitted signal levels. The coupled noise can mask the RF signals or cause errors in signal data streams. Unfortunately, the dominant mechanisms, generators and nature of noise coupling between the circuit devices and on-chip antennas have not been well understood.

SUMMARY

An integrated circuit layout and architecture for reduced noise coupling between circuitry and on-chip antenna for wireless communications includes a monolithic semiconducting substrate having a plurality of integrated devices including a transmitter and/or a receiver. At least one on-chip balanced antenna formed in or on the substrate. A balanced antenna feed structure electrically connects the antenna to the transmitter or receiver. At least one of the plurality of integrated devices are substantially symmetrically disposed on the substrate relative to the on-chip antenna(s). The devices selected for substantially symmetrically placement are preferably those which are the largest noise coupling-contributor(s).

The plurality of integrated devices can include analog device one digital devices on the same chip. The digital devices can include a digital signal processor. The integrated devices can include at least one sensor, including a MEMS sensor.

The integrated circuit can have an RF signal source in or on the substrate. In a preferred embodiment, the bulk resistivity of the substrate is from 1 to 1000 ohm-cm, such as 10 or 100 ohm-cm.

The integrated circuit can include a dedicated transmit and a dedicated receive antenna. The balanced antenna can be a dipole, loop or patch antenna. The integrated circuit can include an on-chip signal source coupled to the balanced feed structure.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Figure 1:
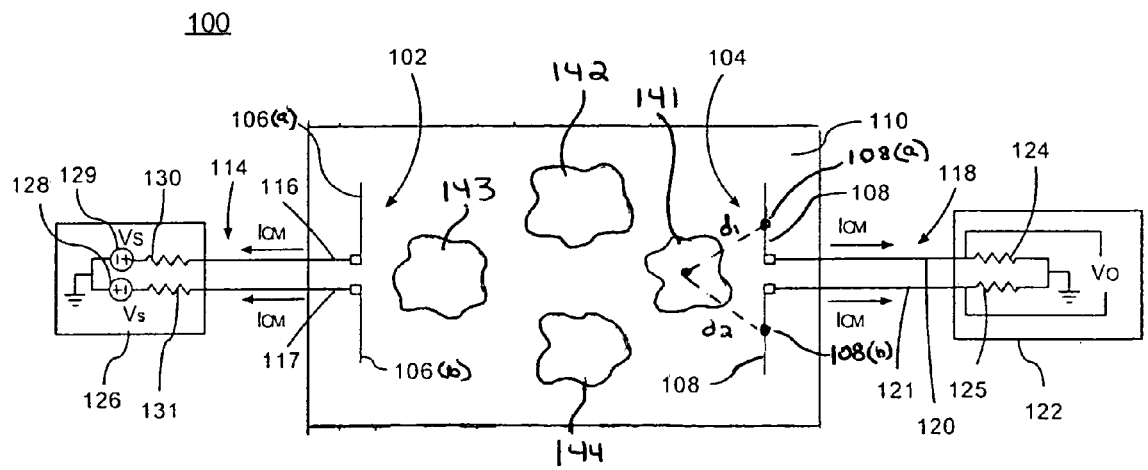
FIG. 1 is a schematic view of an exemplary integrated circuit including on-chip antennas, according to an embodiment of the invention.

The inventors have identified noise coupling mechanisms between integrated circuit device elements and on-chip antennas as well as the nature of the noise received by the on-chip antennas. As used herein, the phrase "on-chip antenna" refers to an antenna disposed in or on a semiconductor substrate, such as a dipole antenna formed from aluminum traces disposed on a silicon substrate. It has been found that noise coupling from devices on the chip to on-chip antennas is mostly through the common semiconductor substrate and the noise which couples therethrough is generally common-mode in nature, particularly when generated by certain digital devices during switching. Symmetric layout techniques with regard to the placement of the largest noise generating circuitry with respect to the on-chip antenna(s), preferably together with use of a balanced feed and balanced antenna has been found to significantly reduce noise coupling and improve the often problematic and frequently application limiting received signal-to-noise ratio. The invention is applicable to both intra-chip and inter-chip wireless communication devices and can be integrated with MEMS devices on the same chip.

On-chip antennas as used herein are structurally and operationally distinct as compared to the more common "integrated antennas". "Integrated antennas" generally refer to RF printed board circuits including microstrip antennas which are disposed on ceramic circuit boards, such as the polytetrafluoroethylene (PTFE) based composites RT/duroid® 6002 provided by Rogers Microwave Products, Chandler, Ariz. On-chip antennas are disposed in or on a semiconducting substrate, such as a silicon substrate.

An integrated circuit for wireless communications comprises a monolithic semiconducting substrate comprising a plurality of integrated devices including a transmitter and/or a receiver, at least one on-chip balanced antenna formed in or on said substrate, and a balanced antenna feed structure electrically connecting the antenna to the transmitter or receiver. The transmitter and receiver are balanced circuits. At least one of the plurality of integrated devices are substantially symmetrically disposed on the substrate relative to the on-chip antenna(s). The devices selected for substantially symmetrically placement are preferably those which are the largest noise coupling contributor(s). Such substantially symmetrically placement of devices on chip relative to the on chip antenna(s) is believed to be unknown prior to the invention.

As used herein the phrase "substantially symmetrically disposed on the substrate relative to the on-chip antenna" refers to physical spacing distances relative to a center of a noise source of a given device to midpoint of respective members of an on-chip antenna (see $d_1$ and $d_2$ in FIG. 1 in the case of a dipole antenna), where the distances $d_1$ and $d_2$ are within 10% of one another, preferably being within 5% of one another and most preferably being within 1% of one another. More generally, as applied to a loop antenna, the distances to two points of symmetry should be the substantially same as shown below.

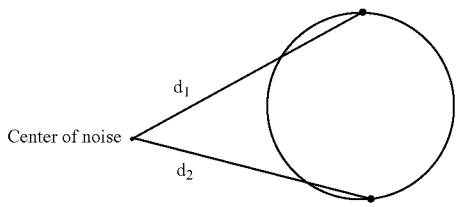

Referring now to FIG. 1, a simplified schematic view of an exemplary integrated circuit 100 including two on-chip antennas 102 and 104 which provides reduced noise coupling between certain circuitry on the substrate 110 and the on-chip antennas 102, 104 is shown. Antenna 104 has the physical midpoint of its respective dipole arms 108(a) and 108(b) marked with large dots. Circuit 100 includes a plurality of devices including digital circuit 141, and analog circuits 142, 143 and 144. Digital circuits can include digital signal processors. Analog circuits 142-144 can include a voltage controlled oscillator (VCO), filter, and amplifier, mixer, phase locked loop, power amplifier, and others including various sensors. The sensors can be MEMS sensors. Although two on-chip antennas 102, 104 are shown in FIG. 1, the invention is not so limited and integrated circuit 100 can include one on-chip antenna, or more than two on-chip antennas.

The distance from the physical midpoint of dipole arms 108(a) and 108(b) to the center of noise generated by switching digital circuit 141 is denoted as $d_1$ and $d_2$, respectively. Since $d_1$ and $d_2$ are nearly equal, being within 10% of one another, antenna 104 is substantially symmetrically disposed on the substrate relative to on-chip antenna 104. Analog circuit 143 may also satisfy this limitation. As a result of the substantially symmetric layout provided by circuit 100, the phase shift and amplitude of noise generated by digital circuit 141 (and analog circuit 143) through the substrate 110 as common mode noise will be received as primarily common mode noise.

The bulk resistivity of the substrate is preferably sufficiently high so that on-chip antenna characteristics (e.g. gain) are reasonable, and sufficiently low that the substrate acts as a conductor sufficient to render the noise generated by the circuitry on chip primarily common-mode in nature. Bulk substrate resistance in the range from about 1 to 1000 ohm-cm is generally appropriate for this purpose.

Such noise is rejected by the balanced (differential) feed 118 and differential antenna 104 arrangement shown in FIG. 1. As a result, when antenna 104 is receiving over the air signals, the resulting signal-to-noise ratio of the received signal will be improved relative a layout where noise generating switching digital circuit 141 is not substantially symmetrically disposed on the substrate relative to on-chip antenna 104. This improvement can be at least 10 dB, and up to 20 dB, or more.

The on-chip antennas 102, 104 can be any antenna type having a differential structure. Although shown as dipoles, antennas 102 and 104 can be other balanced antenna types, including loop antennas, spiral antennas, and patch antennas. Dipole arms 106(a) and (b), and 108(a) and (b) can have any suitable dimensions for achieving desired design parameters and can be formed from any suitable electrically conductive material. For example, dipole arms 106 and 108 can be formed from aluminum or copper comprising layers disposed on substrate 110.

Antenna 102 is shown as a transmit antenna operatively connected to a radio frequency (RF) signal source 126. The RF signal source 126 can comprise one or more voltage sources 128, 129 and source resistances 130, 131. In a preferred arrangement, the magnitude of the voltage generated by the voltage sources 128, 129 is approximately equal. The RF signal source 126 can be, for example, a radio transmitter or a radio transceiver, or any other suitable source of RF energy.

Antenna 104 is shown in FIG. 1 as being a receive antenna operatively connected to a receiving device 122, which in FIG. 1 is shown simply as resistors 118. Receiving device 122 can be a radio receiver, a radio transceiver, and or any other device suitable for receiving RF energy.

As noted above, balanced feedlines are preferably used with balanced antennas and balanced receivers and transmitters to avoid the need for baluns. Antennas 102, 104 are shown operatively coupled to balanced antenna feed structures 114 and 118, respectively. A balanced feedline is realized using a plurality of conductors wherein the current on the conductors is equal in magnitude, but opposite in phase (180° out of phase). Feedlines 114, 118 each can comprise two buried conductors traces 116, 117 and 120, 121, respectively. Buried conductors are conductors not connected directly to a DC ground. For instance, one or more devices, such as resistors 124, 125, 130, 131, can be connected between the conductors 120, 121, 116, 117 and ground potential, respectively. In the preferred arrangement, each of resistors 124, 125 have approximately equal resistance values, and each of the resistors 130, 131 also have approximately equal resistance values.

Figure 2:
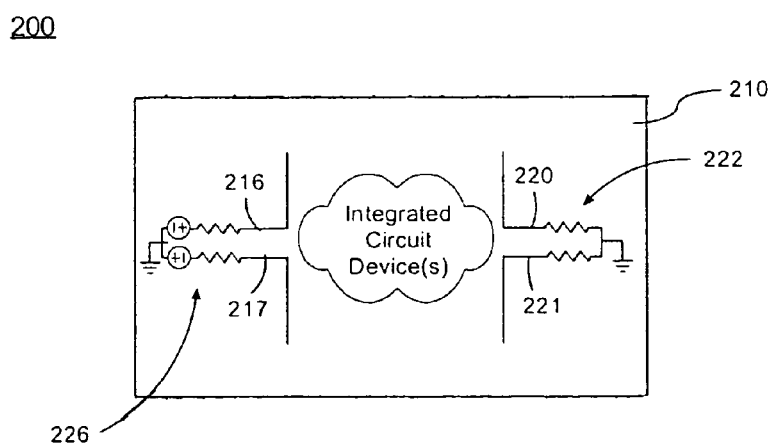
FIG. 2 is a schematic view of another embodiment of the invention comprising an integrated circuit including on-chip antennas and on-chip transmitter and receive circuitry.

The integrated circuit of FIG. 1 is shown with both the RF signal source 126 and the device 122 for receiving RF signals external to the integrated circuit 100. The invention is not so limited. For example, FIG. 2 shows integrated circuit 200 where the RF signal source 226 and/or receiving device 222 is included on-chip. In this arrangement, conductors 216, 217, 220, 221 can be electrically conductive traces disposed in, or on, a substrate 210.

Again referring to FIG. 1, the operation integrated circuit 100 having the balanced feedline structures 114, 118 will now be described. As noted above, noise generated from circuit devices can be injected into the substrate 110 of the integrated circuit 100 and couple to the on-chip antennas 102, 104. Such noise has been found to principally be common mode noise. A differential structure, such as a dipole antenna, loop antenna, or any other suitable balanced antenna, which is driven by a balanced line reduce the adverse effects of common mode noise signals on the RF signal source 126 and the device 122 for receiving RF signals. In particular, such an arrangement provides immunity to ground loops and provides cancellation of common mode voltages. Using the substantially symmetrically layout according to a preferred embodiment of the invention of the principal noise generating devices relative to the to on-chip antenna further improves rejection of common mode noise signals.

As shown in FIG. 1, common mode noise current $I_{CM}$ can flow through conductors 120, 121. The common mode noise current $I_{CM}$ can be generated both by noise coupling to the antenna 104 and by noise coupling directly to the conductors 120, 121. The common mode noise current $I_{CM}$ will typically have approximately equal phase and amplitude on both conductors 120, 121 as the conductors are adjacent to one another. Accordingly, since the resistance values of resistors 124, 125 are approximately equal, there is little or no potential difference between the conductors 120, 121 caused by the coupling of common mode noise signals. Thus, an output voltage $V_O$ measured across conductors 120, 121 will have little, if any, common mode noise content. However, if there is a difference $\Delta R$ between the resistance values of the resistors 124, 125, an amount of common mode noise which is proportional to $\Delta R$ will be coupled to the output voltage $V_O$.

A difference between resistor 120 and resistor 121 resistance values can result in some common mode noise being incorporated in output voltage $V_O$. Likewise, a difference in coupling strength of the noise signal with respect to dipole arms 108(*a*) and (*b*), and between conductors 120, 121 also can result in some common mode noise being received. The above noise analysis also holds true with respect to common mode signals coupling to conductors 116, 117.

EXAMPLES

The present invention is further illustrated by the following specific examples, which should not be construed as limiting the scope or content of the invention in any way.

As noted above, noise from digital circuits as well as analog circuits can couple to on-chip antennas and significantly degrade the received signal-to-noise ratio. To investigate coupling mechanisms, on-chip antennas and some exemplary noise generating circuits were fabricated using 0.25 μm and 0.1 μm CMOS processes. The test structures fabricated consisted of single-metal on-chip antennas and various noise generating circuits.

Figure 3:
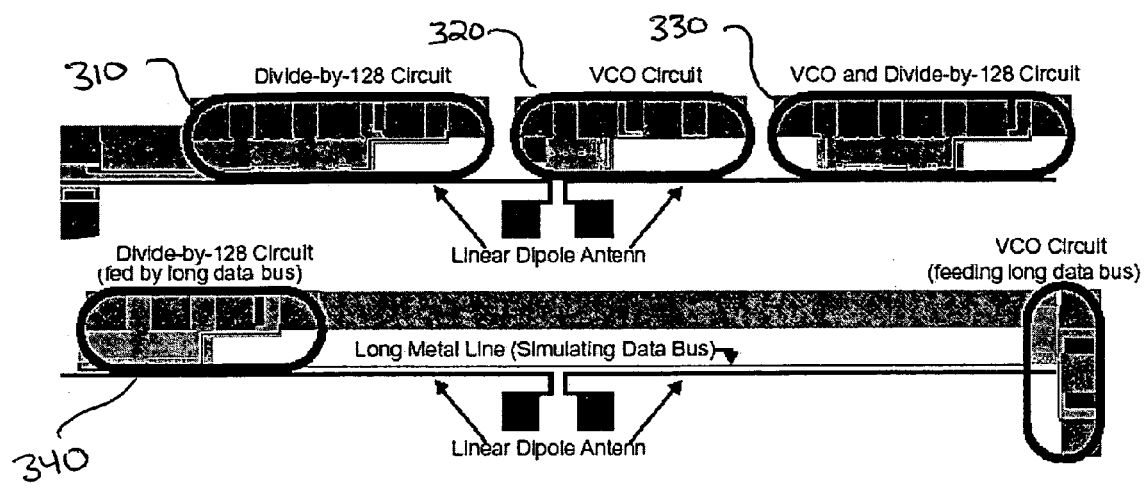
FIG. 3 shows the test structures fabricated in a 0.25 µm foundry CMOS process.

FIG. 3 shows the test structures fabricated in a 0.25 μm foundry CMOS process. On-chip 2-mm linear dipole antennas were formed using the top aluminum layer of the five-metal process. Noise generating circuit included a divide-by-128 frequency divider 310, a voltage-controlled oscillator (VCO) with a tuning range of up to ~2 GHz 120, a combination of the VCO output driving the divider via a short interconnect 130, and a divide-by-128 frequency divider fed by a long data bus coupled to a VCO circuit feeding the long data bus, where the long data bus interconnect is spaced 12 μm away from the antenna 340. The divide-by-128 circuit 310 consists of seven cascaded divide-by-two subcircuits. The single 2:1 divider subcircuit switches the frequency generated by the previous stage. Thus, in the cascaded divider 310, multiple switching rates are produced.

Figure 4:
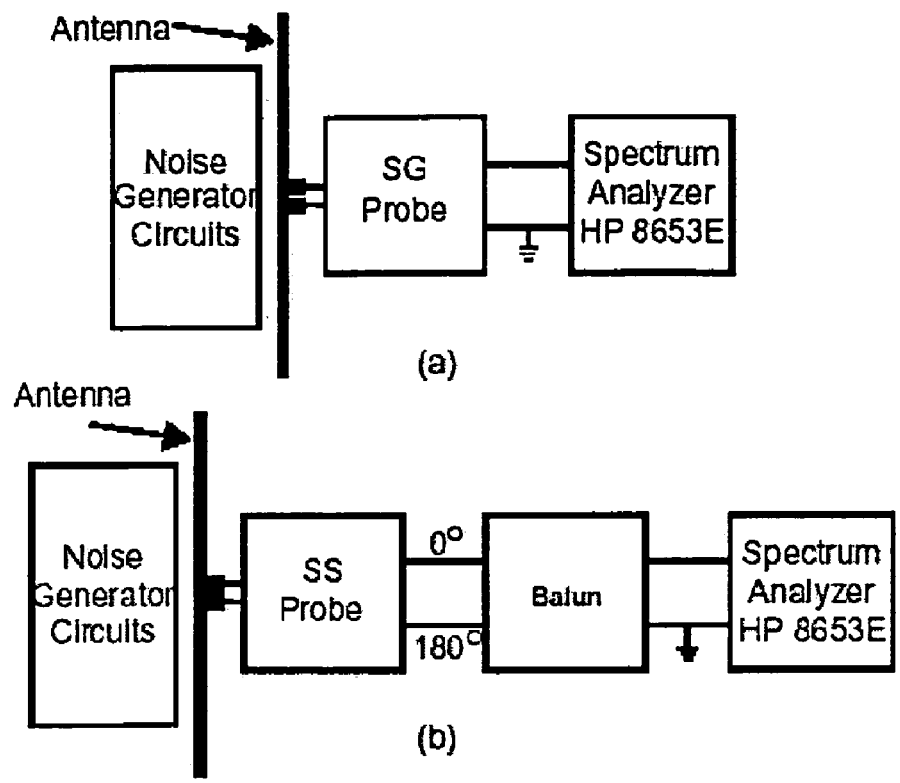
FIGS. 4($a$) and ($b$) shows single-ended and balanced measurement configurations used to evaluate the test structures measured, respectively.
Figure 5A:
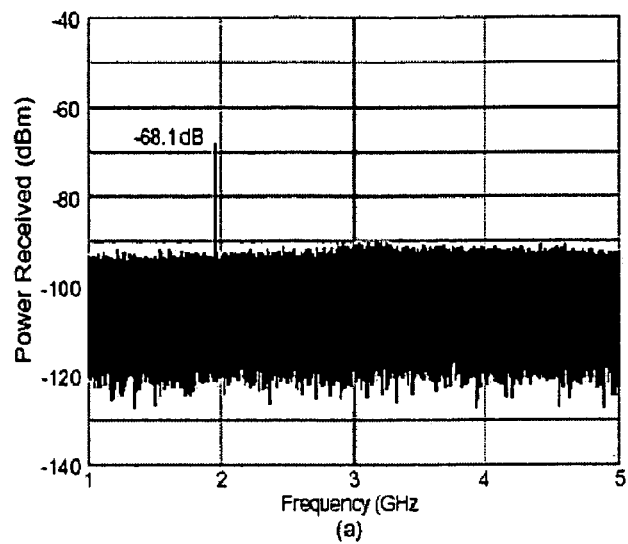
FIGS. 5($a$) and ($b$) show results obtained from single ended and differential noise coupling originating from a voltage controlled oscillator (VCO) noise source, respectively.
Figure 5B:
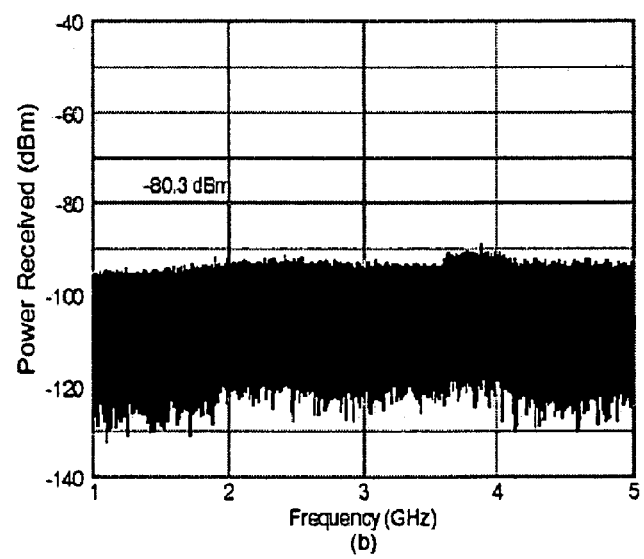

The power spectral density of noise coupling to the on-chip antennas was measured using both single-ended and balanced measurement techniques shown in FIGS. 4(*a*) and (*b*), respectively. The latter is more indicative of noise seen at the input to a fully differential receiver. Noise coupling from the VCO to the on-chip antenna was seen only at harmonics of the VCO operating frequency. A significant reduction in energy (~12 dB) was seen in the balanced measurement, as seen in FIGS. 5(*a*) and (*b*). The reduction in noise coupling demonstrated indicates that the noise is largely common-mode in nature. This noise is believed to be attributed to substrate current injected during switching transients, which is common mode in nature. For the divider circuits, noise coupling in single-ended measurements was seen at the input frequency and its subharmonics. However, in differential measurements this noise is reduced below the noise floor of the measurement setup, again indicating that common-mode noise is produced.

Figure 6A:
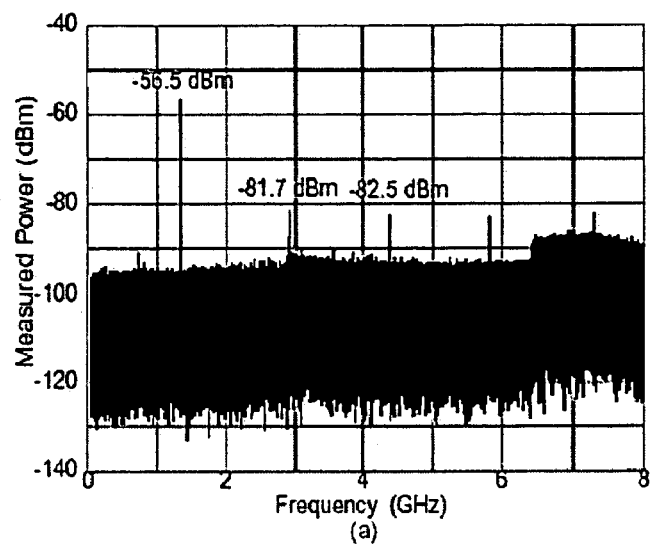
FIGS. 6($a$) and ($b$) show measured and simulated noise coupling results from a long interconnect to an on-chip antenna, respectively.
Figure 6B:
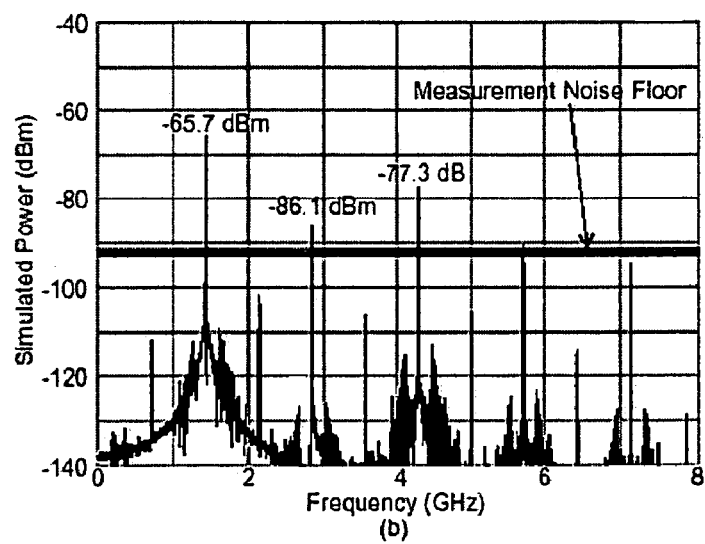
Figure 7:
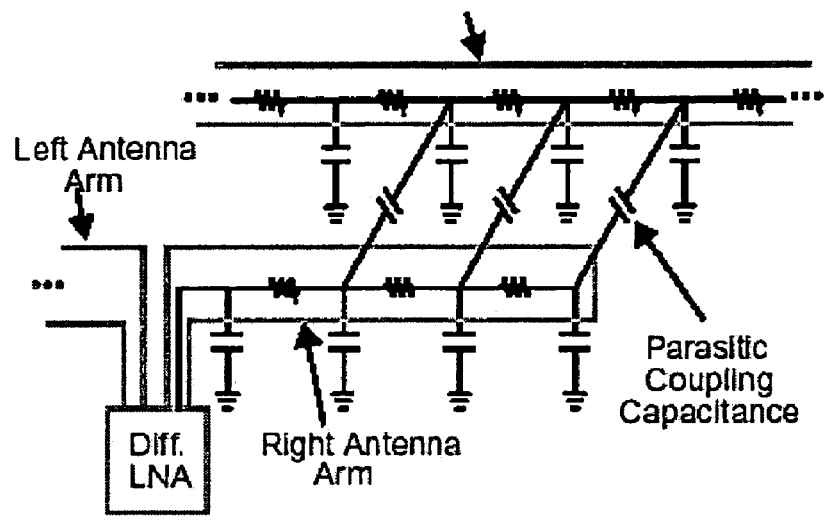
FIG. 7 shows the modeling of an interconnect line and antenna arm as a capacitively coupled RC network.

Noise coupling from the long interconnect simulated data bus test structure of FIG. 3(*d*) was investigated to emulate the scenario of a long data bus running near an on-chip antenna. The measured noise power spectral density shows coupling at harmonics of the VCO output/divider input frequency. This noise is seen in balanced measurements as shown in FIG. 6(*a*), indicating presence of noise which is not common-mode in nature. The interconnect line and antenna arm can be modeled as capacitively-coupled distributed RC networks, illustrated in FIG. 7. Propagation delays and loss in the interconnect will cause the signal on the interconnect to couple to the antenna arms with different magnitude and phase at different points along the line. Thus, the noise is no longer common-mode in nature and will be seen differentially at the output of the antenna. Simulation results using the distributed model are shown in FIG. 6(*b*). Simulations show qualitatively agreement with the measured results.

Figure 8:
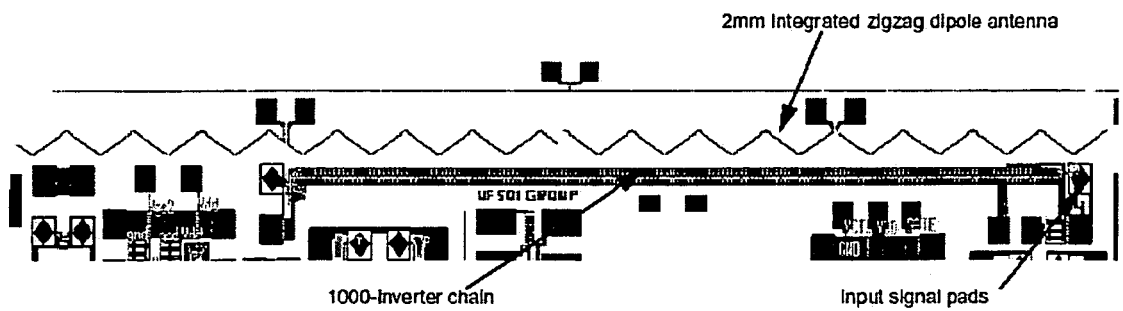
FIG. 8 shows a test structure used to evaluate noise coupling in a 0.1 µm CMOS test circuit.
Figure 9A:
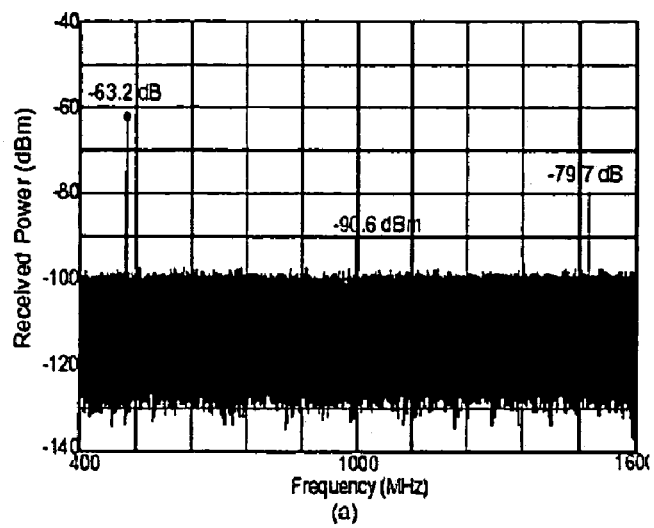
FIGS. 9($a$) and ($b$) show differential noise from the inverter shown in FIG. 8 with inverter switching and without inverter switching, respectively.
Figure 9B:
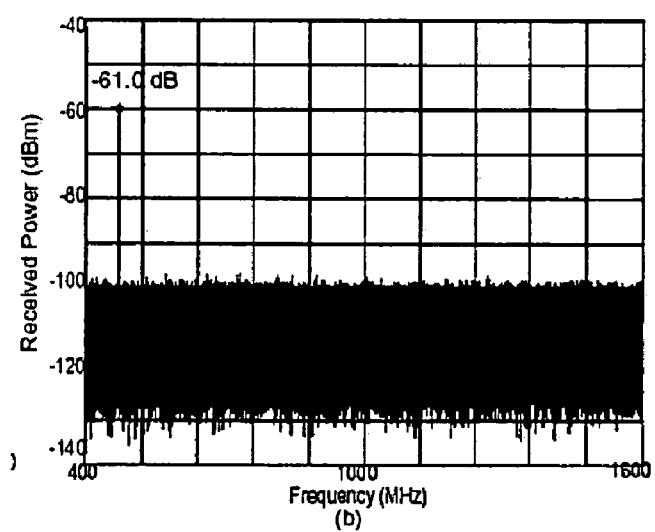

To examine noise coupling in an advance CMOS process, test structures were fabricated in a partially-scaled 0.1 μm CMOS process. The process uses a 0.35 μm design rules set, with the exception of a 0.15 μm drawn (0.1 μm effective) gate length. The 0.1 μm test structure shown in FIG. 8 consists of a 1000-inverter-long chain running along the entire length of an on-chip 2-mm zigzag dipole antenna fabricated on the top metal layer. Again, the power spectral density of the received noise was measured in single-ended and balanced configurations. The inverter chain was driven by a 500 MHz signal generated off-chip, with high-frequency probes used to apply the signal to the input pads on the right side of the test structure. Balanced measurement results in FIG. 9(*a*) show that noise couples to the antenna at harmonics of the inverter chain switching frequency. Once again, this noise is more than 10 dB less than the noise coupled in singled-ended measurements. Noise coupling to the antenna due solely to the signal source was measured and shown in FIG. 9(*b*).

These results show that most of the noise in the balanced setup at the fundamental frequency can be attributed to unbalanced coupling from the input pad and probe to one of the antenna arms, thus creating unbalanced noise that will appear differentially. This peak can be eliminated by having an on-chip signal source.

Figure 10:
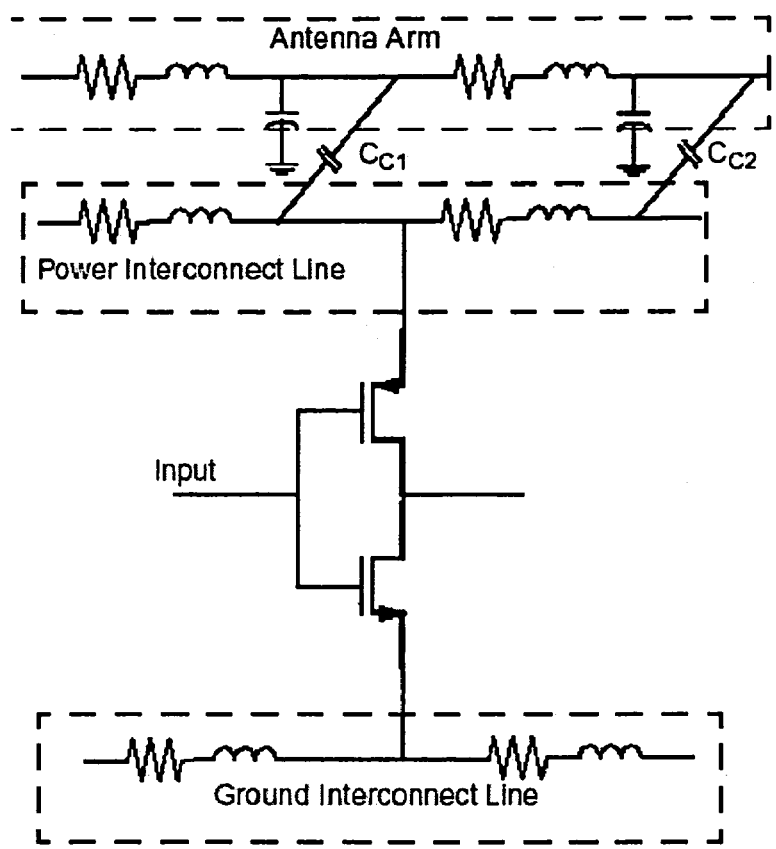
FIG. 10 shows a coupling model from the inverter chain.

Time-varying current in the power and ground lines due to inverter switching will also cause coupling to occur at harmonics of the operating frequency. The power and ground lines can be modeled as transmission lines, with the power line capacitively coupled to the antenna arm as illustrated in FIG. 10. Only the capacitive coupling from the power line to the antenna is considered since it is physically closer to the antenna than the ground line. The self-inductance of the line can be calculated using Greenhouse's method. For a zigzag antenna, the spacing between the power line and antenna varies at different points along the antenna. This must be accounted for when determining the capacitances between the various metal lines, as noted by CC1 and CC2. Shunt capacitances in the transmission line models for the power and ground lines are omitted. This capacitance is comprised of a metal-to-substrate capacitance in parallel with the source-to-bulk junction capacitance of the transistor. Since the junction capacitance dominates, the metal-to substrate capacitance is neglected and the transmission line model relies on SPICE modeling of the junction capacitance to generate the shunt capacitance.

Figure 11:
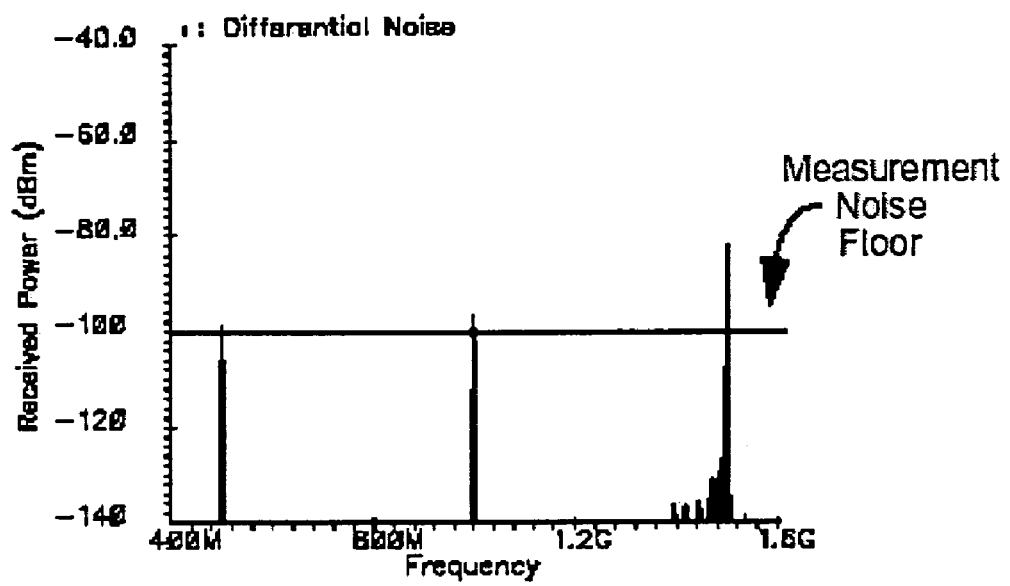
FIG. 11 shows data demonstrating that the coupling model agrees well with the measured results.

For the partially-scaled 0.1 μm process, models and process information needed for parasitic extraction were not avail able. Accordingly, power and ground line coupling to the antenna was simulated using 0.25 μm process parameters. SPECTRE simulation results in FIG. 11 show that the coupling model qualitatively agrees with the measured results. As with the long interconnect, loss and phase delay along the power line will cause noise coupling to be unbalanced and be seen in balanced measurements. Coupling from the signal input pads to the antenna was not included in simulations, which accounts for discrepancies in coupling power at the fundamental frequency. The higher noise power seen at the third harmonics is attributed to the decreased impedance associated with the capacitance between the interconnects at higher.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

We claim:

1. An integrated circuit for wireless communications, comprising:
   a monolithic semiconductor substrate having a plurality of integrated devices including at least one of a transmitter and a receiver disposed in or on said substrate;
   at least one on-chip balanced antenna formed in or on said substrate; and
   a balanced antenna feed structure electrically connecting said antenna to said transmitter or said receiver;
   wherein one of said plurality of integrated devices is a largest noise coupling contributor having a center of noise, and wherein said one said plurality of integrated devices is disposed on said substrate relative to said on-chip antenna such that the center of noise has distances relative to midpoint of respective members of said on-chip antenna, said distances being within ten (10) percent or less of one another.

2. The integrated circuit of claim 1, wherein said plurality of integrated devices include at least analog device and at least one digital device.

3. The integrated circuit of claim 1, wherein said plurality of integrated devices includes a digital signal processor.

4. The integrated circuit of claim 1, wherein said plurality of integrated devices includes at least one sensor.

5. The integrated circuit of claim 4, wherein said sensor comprises a MEMS sensor.

6. The integrated circuit of claim 1, further comprising an RF signal source in or on said substrate.

7. The integrated circuit of claim 1, wherein a bulk resistivity of said substrate is from 1 to 1000 ohm-cm.

8. The integrated circuit of claim 1, wherein said at least one on-chip balanced antenna comprises a dedicated transmit and a dedicated receive antenna.

9. The integrated circuit of claim 1, wherein said balanced antenna is selected from the group consisting of a dipole, loop and patch antenna.

10. The integrated circuit of claim 1, further comprising an on-chip signal source coupled to said balanced feed structure.

* * * * *

UNITED STATES PATENT AND TRADEMARK OFFICE
CERTIFICATE OF CORRECTION

PATENT NO. : 7,466,998 B2  Page 1 of 1
APPLICATION NO. : 10/836524
DATED : December 16, 2008
INVENTOR(S) : Kenneth K. O and Jesal Mehta It is certified that error appears in the above-identified patent and that said Letters Patent is hereby corrected as shown below:

<u>Title Page item 57 Abstract,</u>
Lines 10-11, "substantially symmetrically placement" should read --substantially symmetrical placement--

<u>Column 1,</u>
Line 65, "substantially symmetrically placement" should read --substantially symmetrical placement--

<u>Column 2,</u>
Lines 1-2, "analog device one digital devices" should read --analog devices and digital devices--

<u>Column 3,</u>
Lines 24-25, "substantially symmetrically placement" should read --substantially symmetrical placement--
Lines 26-27, "substantially symmetrically placement" should read --substantially symmetrical placement--

<u>Column 7,</u>
Line 30, "avail able" should read --available--
Lines 41-42, "at higher." should read --at higher frequencies.--

Signed and Sealed this

Fourteenth Day of July, 2009

JOHN DOLL
*Acting Director of the United States Patent and Trademark Office*